UNITED STATES PATENT OFFICE.

ARTHUR PHILIP STITZEL, OF LOUISVILLE, KENTUCKY.

NON-ALCOHOLIC BEVERAGE.

1,149,700. Specification of Letters Patent. Patented Aug. 10, 1915.

No Drawing. Application filed December 21, 1914. Serial No. 878,373.

*To all whom it may concern:*

Be it known that I, ARTHUR PHILIP STITZEL, a citizen of the United States, residing at Louisville, in the county of Jefferson and State of Kentucky, have invented a certain new and useful Improvement in Non-Alcoholic Beverages, of which the following is a full, clear, and exact description.

The object of this invention is to produce a wholesome and economical non-alcoholic beverage from the so-called "spent-beer" obtained in alcohol, spirits or liquor distilling and in the manufacture of vinegar. By "spent beer" I mean spent fermented mash, or spent fermented wash, or spent fermented wort, that is to say, fermented mash, or wash or wort from which the alcohol has been separated or removed by distillation, this product being commonly designated or known by distillers and the Federal Internal Revenue Office as "spent beer". This spent beer contains practically all of the valuable parts of the grain, excepting the starch and sugar, and even some of these remain in a more or less modified form. It therefore affords a splendid material or base for the manufacture of beverages of the class mentioned.

The spent beer may be used in various ways for the making of beverages by varying its composition, or varying in quantity or kind the ingredients with which it is brewed, compounded or otherwise combined. By the different processes of mashing in preparing the wort, and the kind of fermenting process and yeast used in the fermentation of the wort from which the spent beer is derived, the character or composition of the spent beer may be varied greatly, as is well understood by distillers and others.

The invention consists in the manufacture of a beverage from properly prepared spent beer, flavored or otherwise improved and carbonated, as I will proceed now to explain and finally claim.

One way of carrying out my invention consists in utilizing the spent beer derived from mashed and fermented wort which is made of good material and treated in a cleanly manner, as a fit and wholesome base for beverages. This spent beer is boiled or brewed with hops and the resulting product is cooled, settled, filtered and carbonated, and then filled in trade packages. I use from one-half pound to two pounds of hops to thirty-one gallons (one barrel) of spent beer, in accordance with desired strength of hop flavor. Instead of hops, sliced ginger root may be added to the boiling spent beer, in the proportion of from one to one and a half pounds of ginger to the barrel of spent beer, the liquid being kept hot in closed containers for about twenty-four hours. The quantity of ginger will be varied according to the strength of flavor desired.

Any other substitute for the hops may be used in carrying out the invention.

What I claim is:—

1. A non-alcoholic beverage, comprising a mixture of spent beer and a flavoring substance from which the solids have been removed.

2. A non-alcoholic beverage, comprising a carbonated mixture of spent beer derived from mashed and fermented wort and a flavoring substance and deprived of solids.

3. The process of producing a non-alcoholic beverage, consisting in boiling a mixture of spent beer with an addition of a flavoring substance and removing the solids.

4. The process of producing a non-alcoholic beverage, consisting in removing the alcoholic content from mashed and fermented wort, intimately mixing the resulting spent beer with a flavoring substance by heat, and then cooling, settling, filtering and carbonating the product.

In testimony whereof I have hereunto set my hand this 18th day of December, A. D. 1914.

ARTHUR PHILIP STITZEL.

Witnesses:
MARY HURST,
JOS. BUEHNER.